May 24, 1932.  J. C. DUCOMMUN  1,860,141
SKELETON PISTON HEAD
Filed Sept. 20, 1930
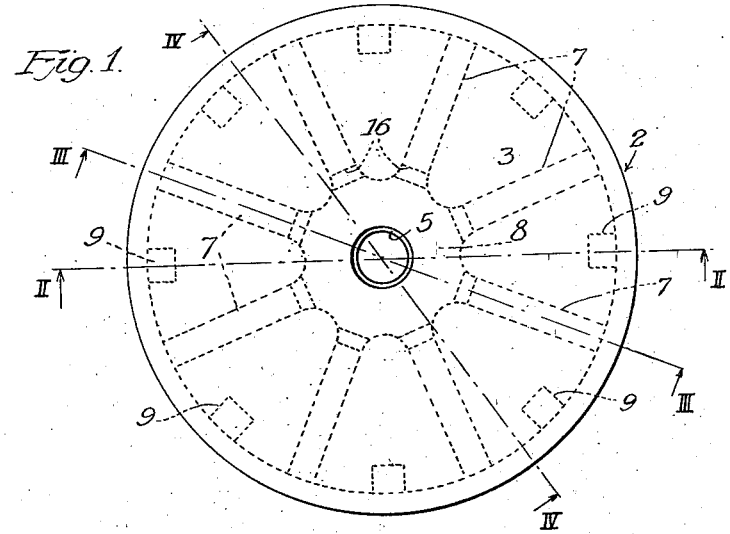
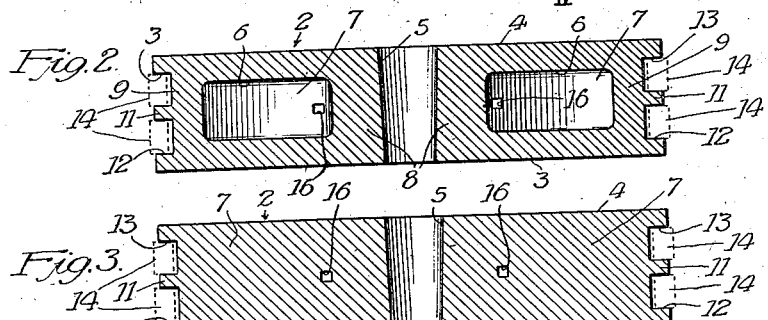
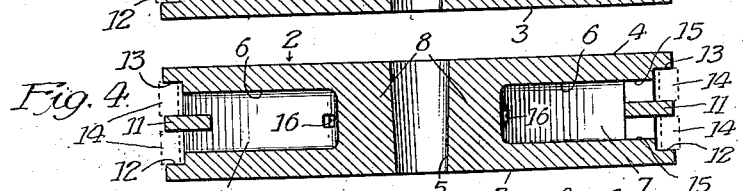
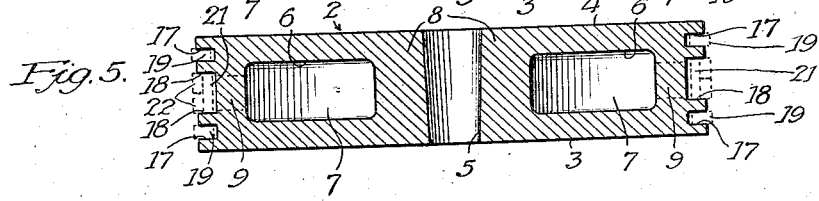
Inventor:
Jesse C. Ducommun
By Bruce K. Brown
Atty.
Witness:
R. B. Davison.

Patented May 24, 1932

1,860,141

UNITED STATES PATENT OFFICE

JESSE C. DUCOMMUN, OF WHITING, INDIANA, ASSIGNOR TO STANDARD OIL COMPANY, OF CHICAGO, ILLINOIS, A CORPORATION OF INDIANA

SKELETON PISTON HEAD

Application filed September 20, 1930. Serial No. 483,327.

This invention relates to piston construction and more particularly to hollow cast iron pistons for reciprocating steam engines and the like although the invention in its broader forms may be applied to other kinds of pistons.

Usually piston heads for reciprocating steam engines are cast iron discs and to afford lightness the discs are made hollow by coring out internal portions. Ordinarily both plane faces, that is, the working faces of the discs are subjected to the load and where, as has been the practice heretofore, the core openings for removal of the core from the interior have been provided through one or both of these faces, considerable trouble has been encountered. The piston heads have failed with serious consequences. These failures have been attributed to the core face openings in the faces of the piston and to the plugs with which these openings are closed before the piston is put into use. These disadvantages have been considered practically insurmountable and it has been the practice to accept them as inevitable.

One of the primary objects of the present invention, therefore, is to provide a piston head, the plane or working faces of which are substantially imperforate, that is, imperforate between an axial opening provided for connection of the piston head to the piston rod and the perimeter of the disc, thereby entirely eliminating any need for plugs or chaplets in the working faces of the piston.

Another object is to provide a piston head of the character described that is particularly strong by reason of radially directed ribs or webs between and integrally connecting the disc face portions and to provide a construction whereby condensed vapors, tending to accumulate in the hollow interior of the piston head, may escape before any damage may be done thereby.

Many further objects, as well as the advantages, uses and purposes of the invention, will be or should become clearly apparent and understood after reading the following description and claims and after viewing the drawings in which:

Fig. 1 is the plan view of one working face of a piston head constructed in accordance with a preferred form of the invention.

Fig. 2 is a sectional view of the form of the invention shown in Fig. 1 taken along the line II—II.

Fig. 3 is a view similar to that of Fig. 2 taken along the line III—III of Fig. 1.

Fig. 4 is a view similar to the views of Figs. 2 and 3 taken along the line IV—IV of Fig. 1 and Fig. 5 is a view closely similar to the view of Fig. 2 but of a modified form of the invention.

Referring first to Figs. 1 to 4 inclusive, the cast iron piston head generally designated 2 is of disc shape and has working faces 3 and 4. A central or axial aperture 5, preferably tapered, is provided for reception of the end of the piston rod to which the piston head is to be connected and any suitable arrangement for connecting the head to the piston rod may be used. The interior of the disc is cored out, as indicated at 6, to provide a cellular structure, the radially directed ribs or webs 7 providing separate walls between the cells or core spaces and integrally connecting and strengthening the working face portions. These ribs or webs extend from a solid center portion 8 outwardly to the rim of the disc.

Intermediate the outer ends of the ribs or webs 7 and likewise integrally connecting the working face portions of the discs, may be one or more posts 9, which serve to support and strengthen the working faces at such places. Extending circumferentially of the disc at its perimeter intermediate the working face portions and connecting the posts 9 may be a ring like portion 11 which serves not only to strengthen the structure but may also serve as one shoulder between which and shoulders 12 and 13, piston rings 14 may be disposed and secured.

The cores in the spaces 6, instead of being supported by chaplets extending through the working faces are supported through the openings 15 which lie between the ribs 7 and posts 9 and between the working face portions and the ring 11, and, instead of being removed through apertures or openings formed in one or both of the working faces 3 and 4, are removed through the openings 15. Since the piston head may reciprocate in a horizontal plane, vapors condensing within the uppermost spaces or cells between the ribs or webs 7 might accumulate to such an extent as to damage the structure seriously, passageways 16 are provided through the ribs or webs 7 adjacent to their inner ends. These passageways may be provided in any suitable manner but preferably by coring. Thus condensed vapors may escape and pass down to the lower side of the piston from which they escape past the piston rings.

It will be appreciated that with the construction described, there is no necessity for core openings, plugs or chaplets on either working face of the piston. On one old type of steam piston used in the steam end of a hot oil surge pump, the total stress has been calculated to be 6,000 pounds per square inch of which stress due to the plugs filling the openings through the working faces is approximately 3,000 pounds per square inch. With the endurance limit of certain cast iron (University of Illinois Bulletin #164) as low as 7,000 pounds per square inch, the calculated stress of 6,000 pounds per square inch leaves a very small factor of safety for the piston. That the strength of the piston is greatly decreased by the core openings in the working faces and by the plugs or chaplets that may be used is quite clearly apparent by comparison of a piston constructed in accordance with the invention with one of the prior types to which reference has been made. In a piston head built in accordance with the invention for use with 110 pounds steam in a steam pump, the unit stress on the piston head is about 2,680 pounds per square inch, giving a safety factor based upon the endurance limit of from 2.0 to 2.5.

In the form of the invention illustrated in Fig. 5, the piston head is provided with three piston ring grooves, two small grooves designated 17 and one large groove 18. Rings 19 are disposed in the small grooves 17 and a large bull ring 21 on which two sealing rings 22 are superimposed may be placed in the large groove 18. Other modifications and changes may be made to suit the exigencies of particular circumstances.

While I have illustrated and described a preferred form of the invention and one modified form thereof, it will be understood and appreciated that the invention is not limited thereto. Therefore, I desire to be limited only by the spirit of the invention and the scope of the appended claims.

I claim:

1. As an article of manufacture, a piston having opposed working faces, integral radial ribs connecting the faces and forming a plurality of spaces therebetween, and apertures extending transversely through the ribs at their inner ends and establishing communication between adjacent spaces, the outer ends of said spaces opening into ring carrying grooves.

2. A piston having opposed working faces, integral radial ribs connecting the faces and forming a plurality of spaces therebetween, the outer ends of said spaces opening into ring carrying grooves.

3. As an article of manufacture, a piston having opposed working faces, said working faces being imperforate between an axial opening for reception of a piston rod and the perimeter of the faces, integral radial ribs connecting the faces and forming a plurality of spaces therebetween, the outer ends of said spaces opening into ring carrying grooves.

4. A piston having opposed working faces, said working faces being imperforate between an axial opening for reception of a piston rod and the perimeter of the faces, integral radial ribs connecting the faces and forming a plurality of spaces therebetween, and apertures extending transversely through the ribs near their inner ends and establishing communication between adjacent spaces, the outer ends of said spaces opening into ring carrying grooves.

JESSE C. DUCOMMUN.